(12) United States Patent
Lee et al.

(10) Patent No.: US 12,405,573 B2
(45) Date of Patent: Sep. 2, 2025

(54) WEBSERVER-BASED VIDEO CONTENT PRODUCTION SYSTEM AND METHOD FOR PRINTING HOLOGRAPHIC STEREOGRAM PHOTO

(71) Applicant: KWANGWOON UNIVERSITY INDUSTRY—ACADEMIC COLLABORATION FOUNDATION, Seoul (KR)

(72) Inventors: Seung Hyun Lee, Namyangju-si (KR); Lee Hwan Hwang, Incheon (KR); Soon Chul Kwon, Seoul (KR); Chan Soo Park, Seoul (KR); Seok Yong Shin, Seoul (KR); Philippe Gentet, Seoul (KR); Jung Ho Kim, Uijeongbu-si (KR); Yong Jung Kim, Seoul (KR)

(73) Assignee: KWANGWOON UNIVERSITY INDUSTRY-ACADEMIC COLLABORATION FOUNDATION, Seoul (KR)

(*) Notice: Subject to any disclaimer, the term of this patent is extended or adjusted under 35 U.S.C. 154(b) by 720 days.

(21) Appl. No.: 17/660,103

(22) Filed: Apr. 21, 2022

(65) Prior Publication Data

US 2023/0205134 A1    Jun. 29, 2023

(30) Foreign Application Priority Data

Dec. 27, 2021   (KR) .................. 10-2021-0188827
Mar. 3, 2022   (KR) .................. 10-2022-0027124

(51) Int. Cl.
  *G03H 1/26*       (2006.01)
  *G06V 10/82*     (2022.01)
  (Continued)

(52) U.S. Cl.
  CPC ............. *G03H 1/268* (2013.01); *G06V 10/95* (2022.01); *G06V 20/46* (2022.01); *G06V 40/171* (2022.01);
  (Continued)

(58) Field of Classification Search
  CPC ............. G03H 1/268; G03H 2001/269; G03H 2226/02; G03H 2226/04; H04N 13/161;
  (Continued)

(56) References Cited

U.S. PATENT DOCUMENTS

| | | | |
|---|---|---|---|
| 2010/0098340 A1* | 4/2010 | Zomet | G03B 25/02 |
| | | | 382/206 |
| 2013/0243269 A1* | 9/2013 | Jankowski | G06V 10/95 |
| | | | 382/118 |

(Continued)

FOREIGN PATENT DOCUMENTS

| | | | | |
|---|---|---|---|---|
| CN | 104318237 A | * | 1/2015 | ........... G06V 40/171 |
| CN | 108513074 A | * | 9/2018 | ........... G06F 3/0304 |

(Continued)

OTHER PUBLICATIONS

"Computer Generated Holography," Holographer.com. Webpage, accessed through archive.org on Oct. 23, 2021 through <https://web.archive.org/web/20211023140252/https://holographer.com/computer-generated-holography/>. Accessed Jan. 27, 2025. (Year: 2021).*

(Continued)

*Primary Examiner* — Kathleen M Broughton
*Assistant Examiner* — Joshua B. Crockett
(74) *Attorney, Agent, or Firm* — BROADVIEW IP LAW, PC (57) ABSTRACT

Provided are a webserver-based video content production system and method for printing a holographic stereogram photo. According to the webserver-based video content (Continued)

production system and method, an encoding process is performed on image data under a web environment to prevent data loss in a network communication process, and then the encoded image data is transmitted to a webserver. The webserver decodes the encoded image data and performs a second-half task (postprocessing) on the decoded image data using deep learning such that a high-quality hologram photo can be printed within a relatively short time without any unnecessary process.

20 Claims, 6 Drawing Sheets

(51) Int. Cl.
*G06V 10/94* (2022.01)
*G06V 20/40* (2022.01)
*G06V 40/16* (2022.01)
*H04N 13/161* (2018.01)

(52) U.S. Cl.
CPC ......... *G06V 40/172* (2022.01); *H04N 13/161* (2018.05); *G03H 2001/269* (2013.01); *G03H 2226/02* (2013.01); *G03H 2226/04* (2013.01); *G06V 10/82* (2022.01)

(58) Field of Classification Search
CPC ...... G06V 10/95; G06V 20/46; G06V 40/171; G06V 40/172; G06V 10/82; G06V 40/18
See application file for complete search history.

(56) References Cited

U.S. PATENT DOCUMENTS

| 2014/0079297 A1* | 3/2014 | Tadayon | G06V 40/172 382/118 |
| 2020/0143838 A1* | 5/2020 | Peleg | G06F 18/2413 |
| 2021/0193184 A1* | 6/2021 | Yuan | G06V 10/806 |

FOREIGN PATENT DOCUMENTS

| KR | 10-1008494 B1 | 1/2011 |
| KR | 10-2014-0144819 A | 12/2014 |
| KR | 10-1517960 B1 | 5/2015 |
| KR | 10-2015-0086815 A | 7/2015 |
| KR | 10-2015-0129260 A | 11/2015 |
| KR | 10-1579626 B1 | 12/2015 |
| KR | 10-2018-0057550 A | 5/2018 |
| KR | 10-2018-0069322 A | 6/2018 |
| KR | 10-1901966 B1 | 9/2018 |
| KR | 10-2020-0104068 A | 9/2020 |

OTHER PUBLICATIONS

Office Action for KR 10-2022-0027124 by Korean Intellectual Property Office dated Jun. 11, 2025.

* cited by examiner

WEBSERVER-BASED VIDEO CONTENT PRODUCTION SYSTEM AND METHOD FOR PRINTING HOLOGRAPHIC STEREOGRAM PHOTO

CROSS-REFERENCE TO RELATED APPLICATION

This application claims priority to Korean Patent Application No. 10-2021-0188827 filed on Dec. 27, 2021 and Korean Patent Application No. 10-2022-0027124 filed on Mar. 3, 2022, which are hereby incorporated by references in its entirety.

BACKGROUND

1. Field of the Invention

The present invention relates to a digital hologram content production technology, and more particularly, to a content production and provision technique for printing holographic stereogram photos.

2. Discussion of Related Art

Holography is a technology in which the interference effect of light is used to record three-dimensional (3D) information which is no different from an actual object. The holography technology is a 3D shaping technology for providing natural 3D effects to an observer by reproducing a stereoscopic image based on an actual image and thereby fundamentally overcoming limitations on existing stereo 3D image expressions.

In digital holography, such a holography technology is implemented using electronic devices and optoelectronic devices, and holographic data is processed through optical information processing. Digital holographic content is holographic fringe patterns that are acquired using electronic devices and optoelectronic devices or generated by mathematical models of wave-optics. Digital holographic content is recorded digitally and thus is easily edited, compressed, and transmitted unlike analog holograms.

Digital holograms can be generated not only for actual objects but also from virtual 3D objects. For example, a digital hologram is generated from a content source through a formula for mathematically modeling light diffraction into computer language (C/C++, MATLAB, etc.) code. The generated digital hologram may be input to an apparatus for optically restoring and reproducing hologram images or verified through numerical restoration based on computer simulation.

Although digital holography technology is continuously under rapid development in theoretical aspects, it has not yet reached a commercial level in terms of physical and device aspects. Generating a digital hologram requires knowledge about diffractive optics and holography from a content creator or an editor. Accordingly, this serves as an entry barrier in content creation and hinders popularization of digital hologram content.

SUMMARY

The present invention is directed to providing a webserver-based video content production system and method that enable anyone to simply produce digital hologram content for printing a holographic stereogram photo in a web environment.

Objects of the present invention are not limited to that described above, and various other objects may be additionally provided through technologies described in the following embodiments and claims.

According to an aspect of the present invention, there is provided a webserver-based video content production method for printing a holographic stereogram photo, the webserver-based video content production method including: providing image data acquired by imaging a subject through a user terminal to a web; providing the received image data to a webserver; performing a second-half task on the received image data using deep learning to produce video content; and providing the produced video content to the user terminal through the web.

The image data may be any one of image or video data which is acquired by the user terminal imaging the subject through a camera or webcam provided in the user terminal after accessing the web and image or video data which is captured in advance through the camera or webcam provided in the user terminal and stored in a memory.

When the user terminal accesses a webpage, the web may provide description for hologram photography to the user terminal and support an imaging assistance tool.

The image data may be encoded in Base64 format and then transmitted to the webserver.

The production of the video content may include: recognizing a face in all frames of the image data received from the web; deleting a frame with closed eyes among frames of the image data in which the face is recognized; only extracting frames having a certain variation less than a threshold from the frames of the image data, in which the frame with closed eyes has been deleted, to stabilize images and equalize the frames; separating the subject and a background in the extracted frames having the certain variation less than the threshold; and performing postprocessing on the images in which the subject and the background have been separated to produce video content.

The recognizing of the face may include recognizing the face in the frames of the image data using a Haar cascade classifier to select frames with a front of the face.

The deleting of the frame with closed eyes may include: connecting landmarks of a region, which corresponds to an eye among facial landmarks representing major features of the face, with lines and then generating the region corresponding to the eye; calculating an area of the generated region corresponding to the eye; and when the calculated area is a set threshold or less, recognizing a corresponding frame as a frame with closed eyes and deleting the frame.

The stabilization of the images and the equalization of the frames may include: calculating a variation between previous and subsequent frames of an $n^{th}$ frame among the frames of the image data; when the calculated frame variation is the set threshold or more, removing a corresponding frame; and only extracting frames having the certain variation less than the threshold.

The separating of the subject and the background may include separating a foreground and the background using "saliency detection" based on deep learning.

The production of the video content may further include: decoding the encoded image data received from the web; and encoding the produced video content.

The providing of the produced video content to the user terminal may further include providing, by the web, the video content received from the webserver to a user through the user terminal such that the user views the video content and makes a selection.

The providing of the produced video content to the user terminal may further include, when any one piece of the video content is selected by the user, printing, by the web, the selected piece of video content through a holographic stereogram printer.

According to another aspect of the present invention, there is provided a webserver-based video content production system for printing a holographic stereogram photo, the webserver-based video content production system including: a user terminal configured to image a subject and acquire image data; a web configured to receive the image data from the user terminal; and a webserver configured to perform a second-half task on the image data received from the web using deep learning in response to a request from the web to produce video content and then provide the video content to the web.

The image data may be any one of image or video data which is acquired by the user terminal imaging the subject through a camera or webcam provided in the user terminal after accessing the web and image or video data which is captured in advance through the camera or webcam provided in the user terminal and stored in a memory.

When the user terminal accesses a webpage, the web may provide description for hologram photography to the user terminal and support an imaging assistance tool.

The web may encode the image data in Base64 format and then transmit the encoded image data to the webserver.

The webserver may produce the video content through a process including: recognizing a face in all frames of the image data received from the web; deleting a frame with closed eyes among frames of the image data in which the face is recognized; only extracting frames having a certain variation less than a threshold from the frames of the image data, in which the frame with closed eyes has been deleted, to stabilize images and equalize the frames; separating the subject and a background in the extracted frames having the certain variation less than the threshold; and performing postprocessing on the images in which the subject and the background have been separated to produce video content.

The recognizing of the face may include recognizing the face in the frames of the image data using a Haar cascade classifier to select frames with a front of the face.

The deleting of the frame with closed eyes may include: connecting landmarks of a region, which corresponds to an eye among facial landmarks representing major features of the face, with lines and then generating the region corresponding to the eye; calculating an area of the generated region corresponding to the eye; and when the calculated area is a set threshold or less, recognizing a corresponding frame as a frame with closed eyes and deleting the frame.

The stabilization of the images and the equalization of the frames may include: calculating a variation between previous and subsequent frames of an $n^{th}$ frame among the frames of the image data; when the calculated frame variation is the set threshold or more, removing a corresponding frame; and only extracting frames having the certain variation less than the threshold.

The separating of the subject and the background may include separating a foreground and the background using "saliency detection" based on deep learning.

The webserver may decode the encoded image data received from the web, encode the produced video content, and provide the encoded video content to the web.

The web may provide the video content received from the webserver to a user through the user terminal such that the user views the video content and makes a selection.

When any one piece of the video content is selected by the user, the web may print the selected piece of video content through a holographic stereogram printer.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, advantages and features of the present invention and methods of achieving the same will made clear by referring to exemplary embodiments described in detail with reference to the accompanying drawings. However, the present invention is not limited to the exemplary embodiments disclosed herein and may be implemented in various forms. The exemplary embodiments are only provided so that this disclosure of the present invention will fully convey the scope of the present invention to those of ordinary skill in the art. The present invention is only defined by the scope of the claims.

Terms used herein are only intended to describe the exemplary embodiments and not to limit the present invention. In this specification, the singular forms include the plural forms as well unless the context clearly indicates otherwise. As used herein, the terms "include (or have)" and/or "including (or having)" do not preclude the presence or addition of one or more elements other than stated elements. Throughout the specification, like reference numerals refer to like elements. "And/or" includes each of stated items and all combinations of one or more thereof.

Unless otherwise defined, all terms (including technical and scientific terms) used herein have the same meaning as commonly understood by those of ordinary skill in the art. Also, terms defined in commonly used dictionaries will not be interpreted in an idealized or overly formal sense unless clearly so defined herein.

Figure 1:
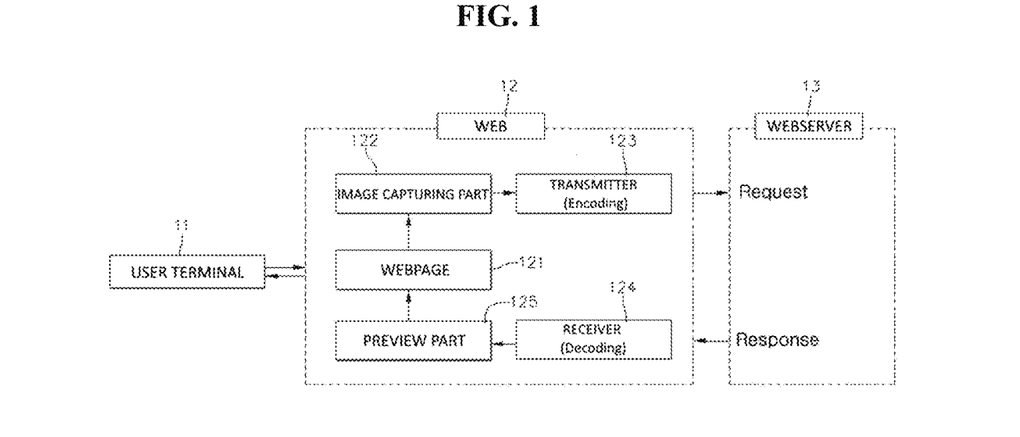
FIG. 1 is a block diagram schematically illustrating a webserver-based video content production system for printing a holographic stereogram photo according to an exemplary embodiment of the present invention.

FIG. 1 is a block diagram schematically illustrating a webserver-based video content production system for printing a holographic stereogram photo according to an exemplary embodiment of the present invention.

Referring to FIG. 1, the webserver-based video content production system according to the exemplary embodiment of the present invention includes a user terminal 11, a web (World Wide Web) 12, and a webserver 13.

The user terminal 11 includes a wired and/or wireless communication module to access the web 12 that provides a video content production service through a communication network (e.g., the Internet).

Also, the user terminal 11 includes a camera for capturing images and/or videos of a subject after the user terminal 11 accesses the web 12. The camera may be an internal camera embedded in the user terminal 11 or an external camera.

Further, the user terminal 11 may include a memory for storing images and/or videos, which are captured in advance, before accessing the web 12. The memory may be an internal memory embedded in the user terminal 11 or an external memory.

For example, the user terminal 11 of the present invention may be any one of a mobile phone (a cellular phone, a smart phone, etc.), a tablet personal computer (PC), a personal digital assistant (PDA), a PC connected to a webcam, etc. In addition, the user terminal 11 may be any device that includes a communication module for accessing the web 12, a camera, a memory, etc.

The web 12 serves as a bridge between the user terminal 11 and the webserver 13 so that a user may receive a video content production service for printing a holographic stereogram photo. In other words, the web 12 provides an environment in which the user terminal 11 may receive the video content production service for printing a holographic stereogram photo.

For example, the web 12 transmits image and/or video data (hereinafter collectively referred to as "image data") provided by the user terminal 11 to the webserver 13, receives video content which is produced on the basis of the image data through processing at the webserver 13, and provides the video content to the user terminal 11. The image data provided from the user terminal 11 to the web 12 may be any one of image and/or video data which is acquired by the user terminal 11 imaging a subject through a camera after accessing the web 12 and image and/or video data which is captured in advance through the camera of the user terminal 11 and stored in a memory.

As shown in FIG. 1, the web 12 may be, for example, a web browser and includes a webpage 121 to be accessed by the user terminal 11. The webpage 121 is a hypertext markup language (HTML) page and provides a method of capturing a hologram photo and the like to the user. Also, the web 12 supports an imaging assistance tool, for example, a guideline, a timer, etc., which assists the user with capturing an image and/or video using the user terminal 11.

The web 12 includes an image capturing part 122. The image capturing part 122 is provided so that the user terminal 11 accessing the webpage 121 may capture an image and/or video using the camera or webcam. After accessing the webpage 121, the user terminal 11 captures an image and/or video through the camera or webcam using hologram photography and the imaging assistance tool provided by the webpage 121.

Also, the web 12 includes a transmitter 123 that transmits the image data acquired by the image capturing part 122 through imaging of the user terminal 11 to the webserver 13. The transmitter 123 performs an encoding process on the image data acquired through imaging of the user terminal 11 for stable transmission to the webserver 13 and then transmits the encoded image data.

The image data acquired through the user terminal 11 may have a relatively large data size, which may cause data loss during data transmission. Accordingly, to prevent data loss in a web environment according to the present invention, the encoding process is performed on the acquired image data before data transmission, and then the encoded image data is transmitted to the webserver 13.

The transmitter 123 may encode the captured image data using an encoding method, for example, in Base64 format. "Base64" is an encoding method of changing 8-bit binary data into a string. Such encoding increases the capacity by 33% due to a reduction in the number of bit expressions, but enables rapid processing because the string is loaded for rendering in the webpage 121. Also, it is possible to prevent loss of binary data in a network communication process.

Figure 2:
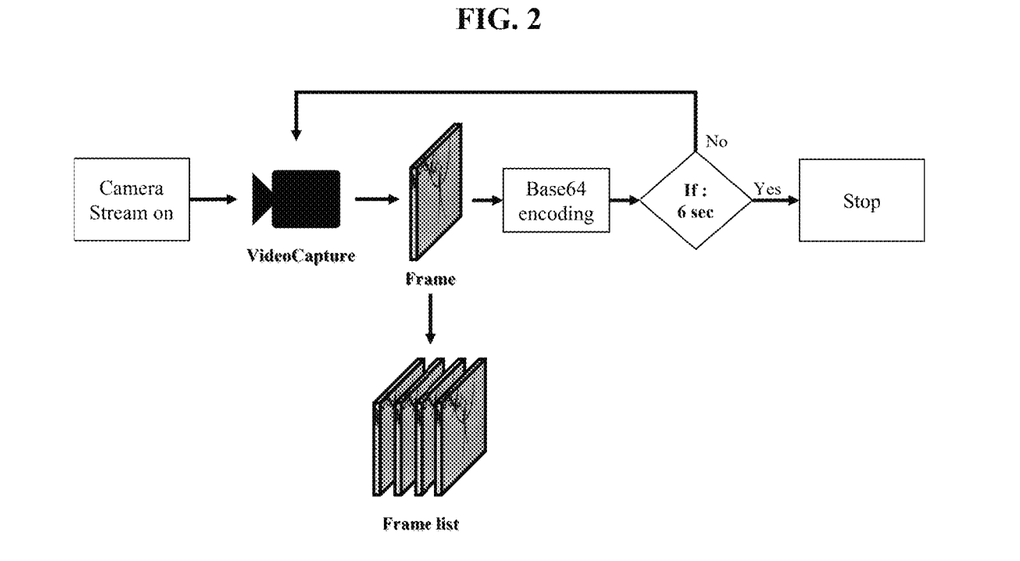
FIG. 2 is a diagram schematically illustrating a frontend of a web shown in FIG. 1.

FIG. 2 is a diagram schematically illustrating a frontend of the web shown in FIG. 1.

Referring to FIGS. 1 and 2, a frontend provided in the environment of the web 12 is a screen that a user may see visually when accessing the webpage 121. On the frontend, permission to use the camera is requested from the user terminal 11 of the user, and when the user permits the webpage 121 to use the camera, the camera of the user terminal 11 is used to perform an imaging task. An imaging time is, for example, six seconds, each of which includes 30 frames, and thus 180 images are stored in total. The stored images are encoded in Base64 format and transmitted to the webserver 13.

The webserver 13 stores and then processes the encoded image data transmitted from the transmitter 123 in response to a request of the web 12 and provides the processed data, that is, video content, to a receiver 124 of the web 12. In other words, the webserver 13 produces video content for printing a holographic stereogram photo by performing a second-half processing task on the image data.

Figure 3:
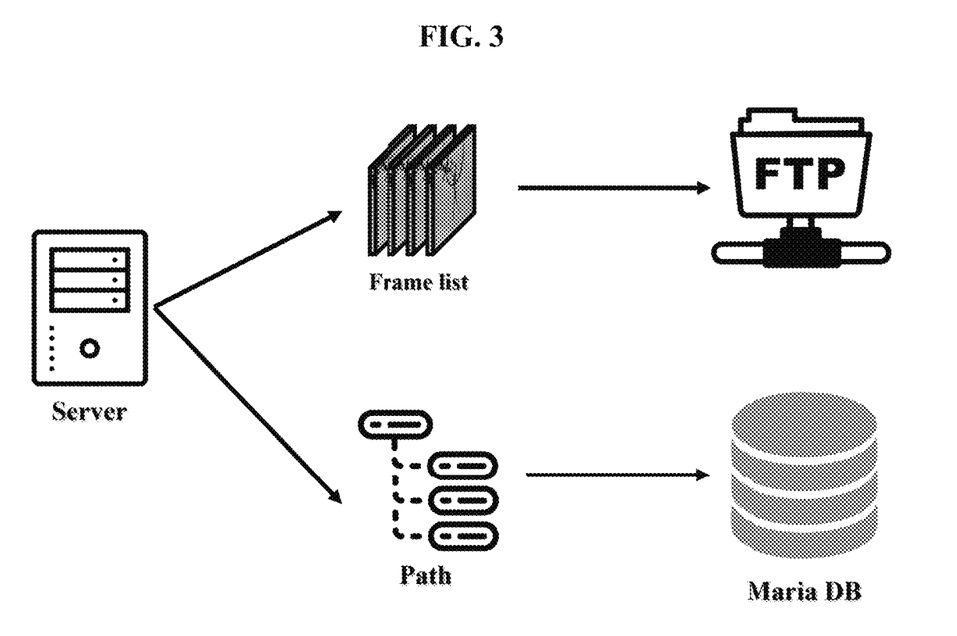
FIG. 3 is a diagram schematically illustrating a backend of a webserver shown in FIG. 1.

FIG. 3 is a diagram schematically illustrating a backend of a webserver shown in FIG. 1.

Referring to FIGS. 1 and 3, a backend is a task in which the webserver 13 processes the image data transmitted by the user. In the present invention, a backend is a webserver image processing task. The webserver 13 receives the encoded data of the 180 images and decodes the encoded data to convert the encoded data into image data available for an image processing task. As the converted image data, image frames optimized for hologram production with face recognition, removal of frames with closed eyes, image stabilization and frame equalization, and foreground and background separation are stored. Results generated in this way may be used for producing a clear hologram.

The receiver 124 decodes the data processed by the webserver 13, that is, video content produced through processing. The webserver 13 encodes the produced video content and transmits the encoded video content to the web 12. Accordingly, the receiver 124 decodes the video content transmitted from the webserver 13 and then transmits the decoded video content to a preview part 125. The user receives a preview of the video content in the webpage 121 through the user terminal 11.

Figure 4:
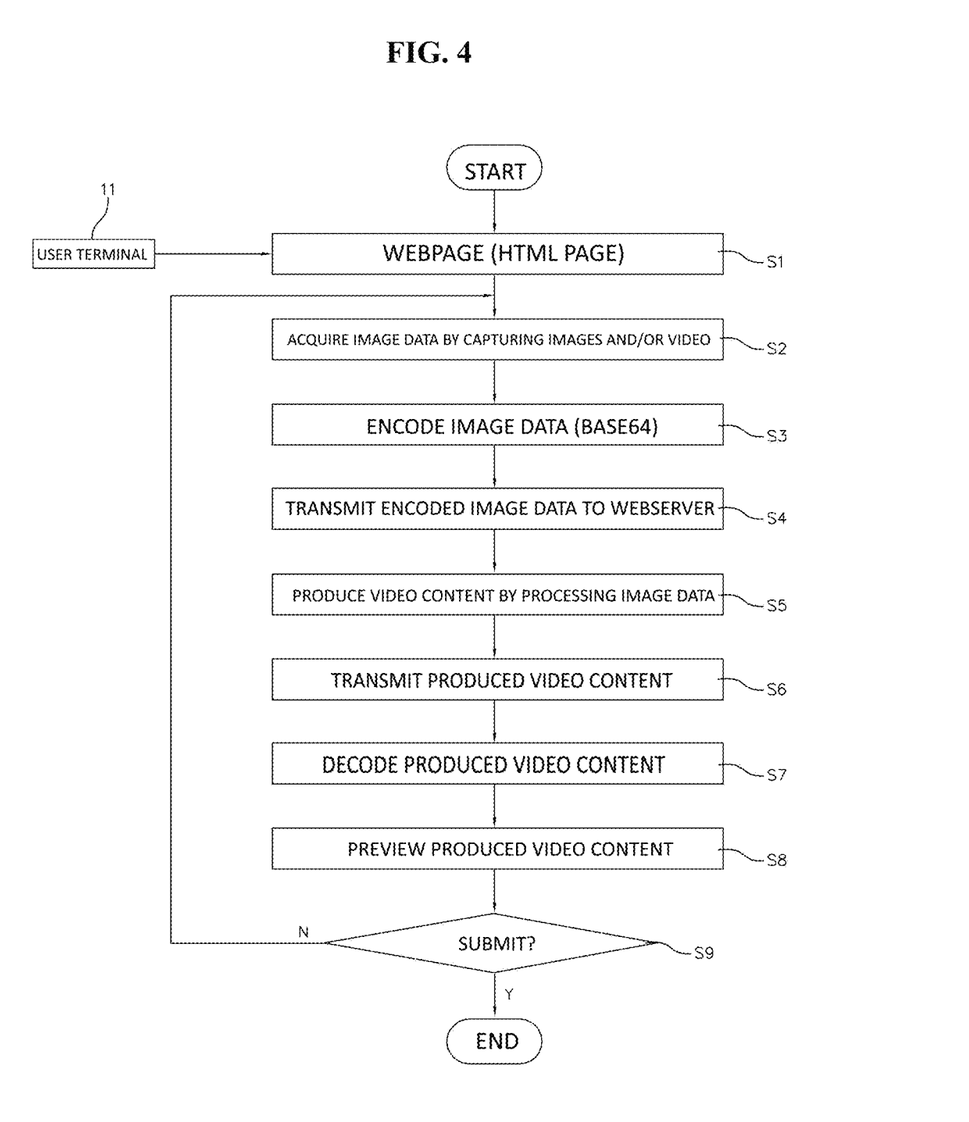
FIG. 4 is a flowchart schematically illustrating a webserver-based video content production method for printing a holographic stereogram photo according to an exemplary embodiment of the present invention.

FIG. 4 is a flowchart schematically illustrating a webserver-based video content production method for printing a holographic stereogram photo according to an exemplary embodiment of the present invention.

Referring to FIGS. 1 and 4, the user accesses the web 12 through the user terminal 11 (51). In the process 51, when the user terminal 11 accesses the webpage 121, a method of capturing a hologram photo is provided to the user, and an imaging assistance tool is supported.

Figure 5:
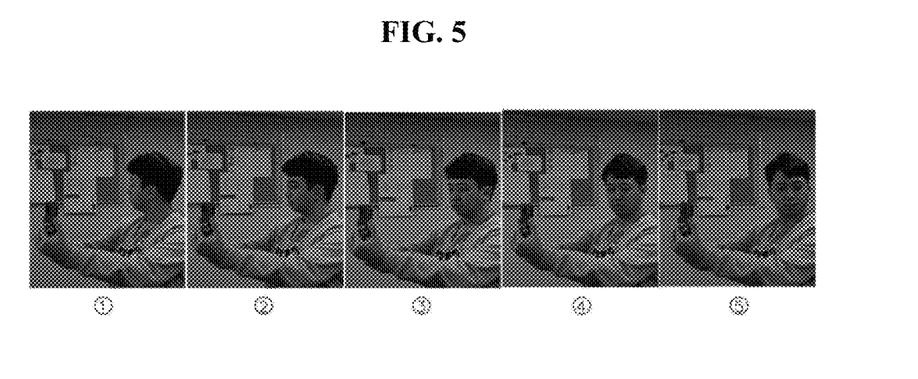
FIG. 5 is a set of diagrams schematically showing an example of image and/or video capturing shown in FIG. 4.

Subsequently, an image and/or video is captured to acquire image data (S2). FIG. 5 is a set of diagrams schematically showing an example of image and/or video capturing shown in FIG. 4.

Referring to FIG. 5, in the process S2, an image and/or video is captured in real time using the camera or webcam of the user terminal in an environment provided by the image capturing part 122. Alternatively, image data which is captured in advance and stored in the memory of the user terminal 11 may be uploaded from the user terminal 11.

Subsequently, the acquired image data is encoded and then transmitted to the webserver 13 through the transmitter 123 (S3 and S4). In the process S3, the image data is encoded in Base64 format.

Subsequently, the webserver 13 receives and stores the image data encoded in Base64 format and produces video content for printing a holographic stereogram photo (S5).

Figure 6:
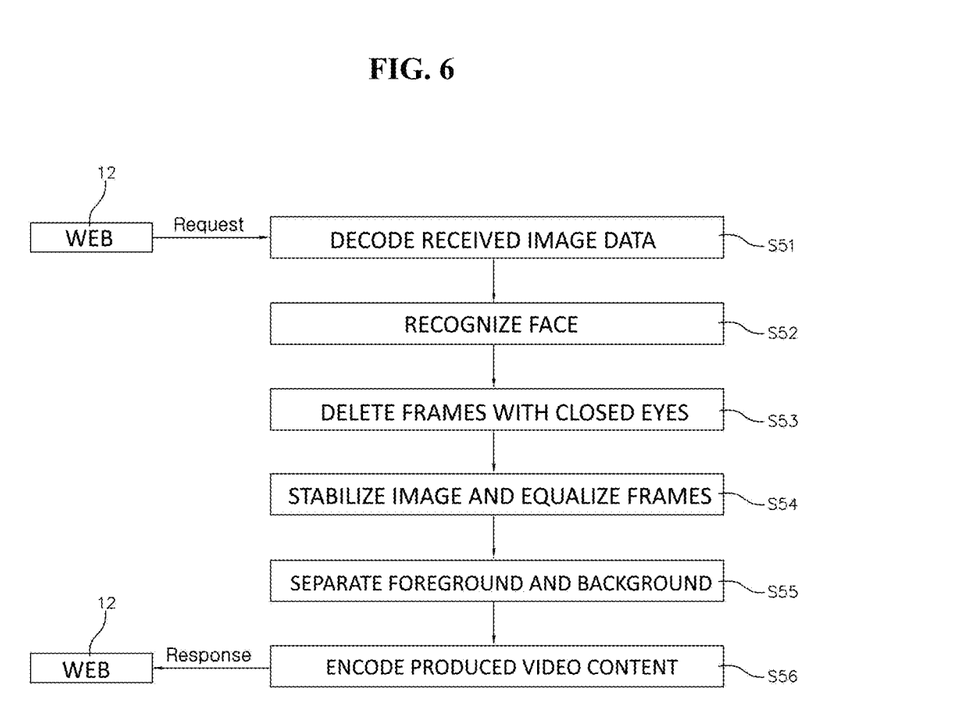
FIG. 6 is a flowchart schematically illustrating a video content production process shown in FIG. 4.

FIG. 6 is a flowchart schematically illustrating a video content production process shown in FIG. 4.

Referring to FIGS. 4 and 6, the video content production process S5 may include a decoding process SM, a face recognition process S52, a process S53 of deleting frames with closed eyes, an image stabilization and frame equalization process S54, a foreground and background separation process S55, and an encoding process S56.

In the decoding process S51, the encoded image data received from the web 12 is decoded.

In the face recognition process S52, a face is recognized in frames of the decoded image data.

Figure 7:
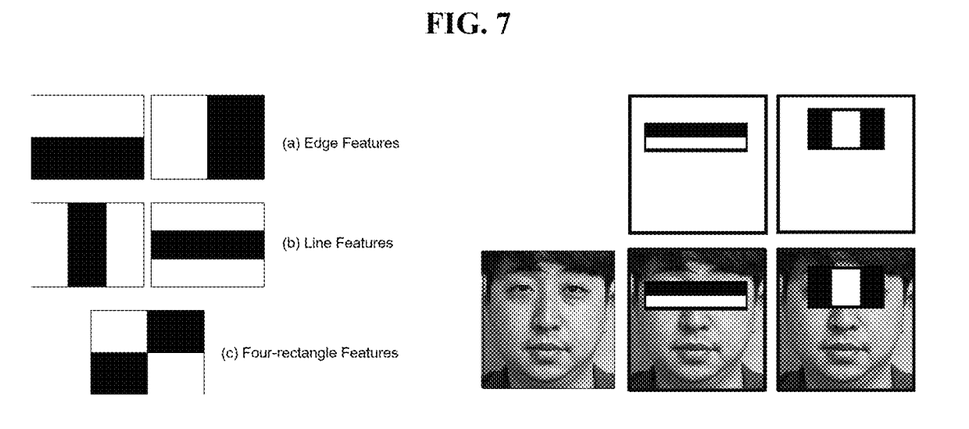
FIG. 7 is a set of diagrams illustrating a Haar cascade classifier for face recognition shown in FIG. 6.

FIG. 7 is a set of diagrams illustrating a Haar cascade classifier for face recognition shown in FIG. 6. FIG. 7A shows image filters, and FIG. 7B is a set of diagrams of actual application examples.

As shown in FIGS. 6 and 7, a frame with a frontal face is selected from among all the frames of the decoded image data to recognize the face using a Haar cascade classifier. As shown in FIG. 7B, when a feature extracted from the frame with a front of the face through each image filter is a feature of the face, computation is stopped, and the face is detected. Since the computation is performed only until the face is detected from the input image data, a real-time face recognition task is possible.

The face recognition process S52 according to the present invention will be described now. The image frames received from the web 12 are decoded, and a reference point is searched for through face recognition to the left and right of a central point of an overall frame matrix. When the number of frames on the left is the same as that on the right on the basis of the frontal face among recorded frames, a hologram is naturally and consistently generated. Accordingly, a process of arbitrarily recognizing a frontal face on the basis of a reference point which is the central point of the overall frame matrix is performed. When the reference point frame is not a frontal face, a left face and a right face are determined, and face recognition is performed by shifting to left and right frames. The above process is repeated through a face recognition result until a frame which has a similar value to a threshold (a parameter) for assuming a frontal face is detected. In this way, an optimal median (a frontal face) is detected, and left and right frames based on the frame are adjusted to be the same in number.

In the process S53 of deleting frames with closed eyes, frames with closed eyes are deleted using facial landmarks which represent major features of the face.

Figure 8:
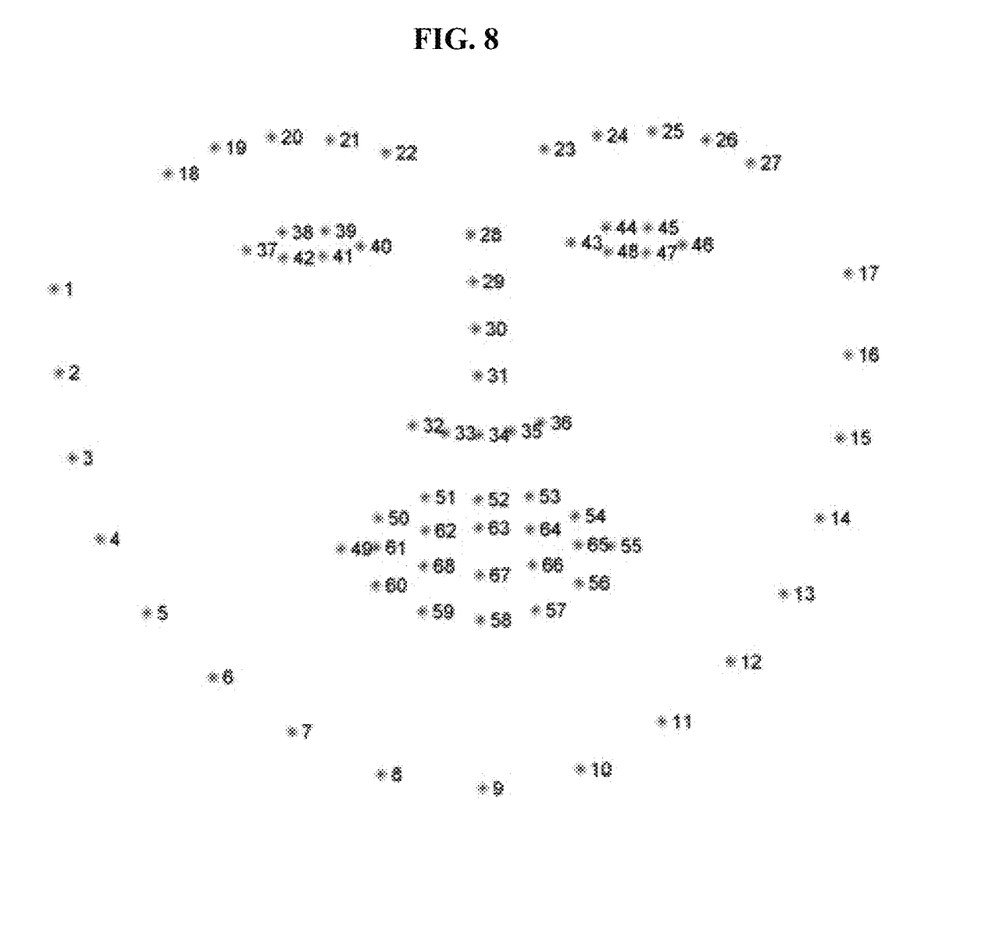
FIG. 8 is a diagram schematically showing facial landmarks used in a process of deleting frames with closed eyes which is shown in FIG. 6.

FIG. 8 is a diagram schematically showing facial landmarks used in a process of deleting frames with closed eyes which is shown in FIG. 6.

As shown in FIGS. 6 and 8, in the process S53 of deleting frames with closed eyes, landmarks of the face are detected using the facial landmarks which represent the major features of the face. The facial landmarks represent outlines of the eyebrows, the eyes, the nose, the mouth, and the face.

According to the present invention, frames with closed eyes can be detected and removed using landmarks of eyes. The process S53 of deleting frames with closed eyes includes, for example, a process of connecting landmarks of a region, which corresponds to an eye among facial landmarks, with lines and then generating the region corresponding to the eye, a process of calculating an area of the generated region corresponding to the eye, and a process of recognizing, when the calculated area is a set threshold or less, a corresponding frame as a frame with closed eyes and deleting the frame.

In the image stabilization and frame equalization process SM, to prevent an awkward hologram photo, images are stabilized and equalized by removing frames having a certain variation or more. This is because an irregular change of an image may result in an awkward hologram photo.

Figure 9:
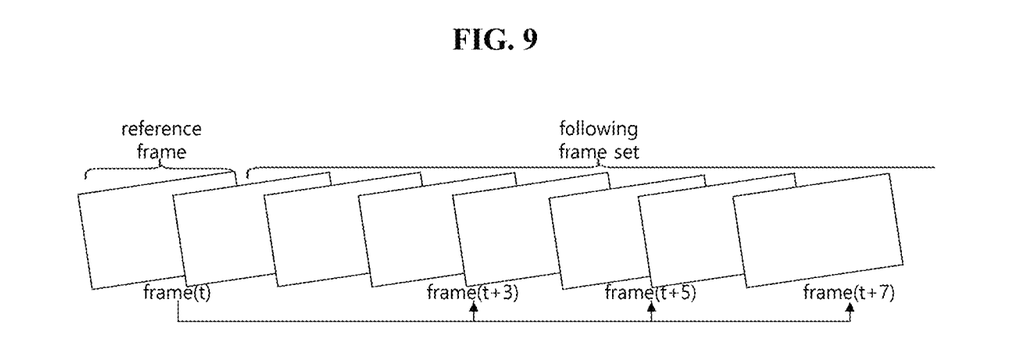
FIG. 9 is a diagram schematically illustrating an image stabilization and frame equalization process shown in FIG. 6.

FIG. 9 is a diagram schematically illustrating an image stabilization and frame equalization process shown in FIG. 6. FIG. 9 schematically shows a process of extracting some frames.

As shown in FIGS. 6 and 9, in image stabilization and frame equalization process S54, image stabilization and frame equalization are performed using a method of extracting only frames having the certain variation by deleting some frames. Regardless of a direction in which a hologram is viewed, a certain motion is maintained by a frame equalization technique. For example, in FIG. 9, a variation between previous and subsequent frames of an $n^{th}$ frame, which is a reference frame, is calculated. When the calculated frame variation is a set threshold or more, a corresponding frame is removed, and only frames having the certain variation less than the threshold are extracted.

In the foreground and background separation process S55, a subject and a background are separated to allow a postprocess, such as a background replacement.

Figure 10:
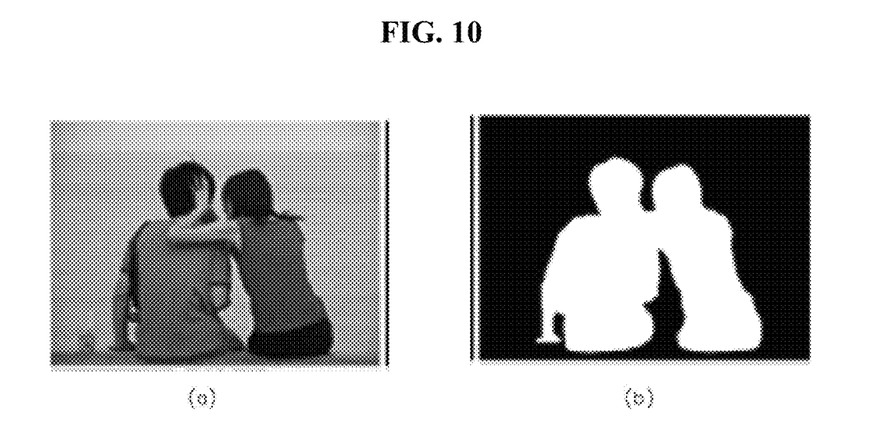
FIG. 10 is a set of diagrams schematically showing a foreground and background separation process shown in FIG. 6.

FIG. 10 is a set of diagrams schematically showing a foreground and background separation process shown in FIG. 6. In FIG. 10, (a) shows an image before a foreground and a background are separated, and (b) shows the image after the foreground and the background are separated.

As shown in FIGS. 6 and 10, in the foreground and background separation process S55, "saliency detection" based on deep learning may be used by way of example to separate the foreground and the background in the image. "Saliency detection" is protruding object detection, a technique for separating an object that is most salient when an image is viewed from a background. This technique is a binary classification technique, with which an object and a background may be precisely separated in units of pixels. In the present invention, for example, people and backgrounds are separated to train a deep learning model. The output of a background region is "0," and the output of a human region is "1," that is, the outputs are binary data. A multiplication operation is performed using the output data as a binary mask such that the image in which only people are left is output. With this process, a photo desired by the user may be set as a background, and in this case, different modification algorithms may be applied to the people and background.

Figure 11:
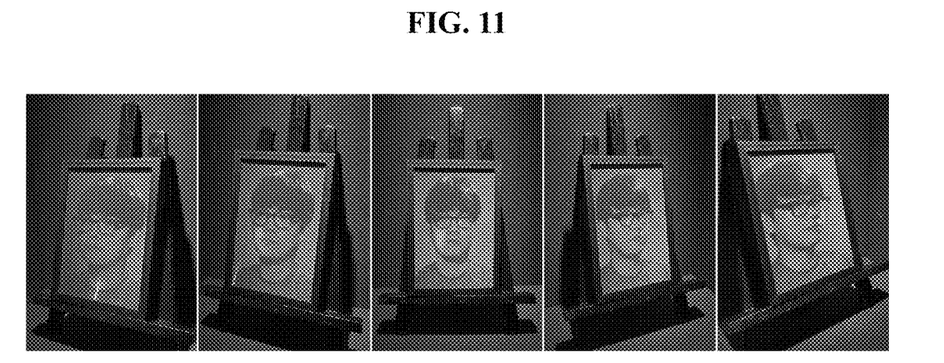
FIG. 11 is a set of diagrams schematically showing results of video content produced through the webserver-based video content production system according to the exemplary embodiment of the present invention.

FIG. 11 is a set of diagrams schematically showing results of video content produced through the webserver-based video content production system according to the exemplary embodiment of the present invention. As shown in FIG. 11, a hologram is produced through the webserver 13 according to the image data shown in FIG. 5.

In the encoding process S56, the video content (sample) optimized through the second-half task, that is, the face recognition process S52, the process S53 of deleting frames with closed eyes, the image stabilization and frame equalization process S54, and a foreground and background separation process S55, is encoded to prevent loss in a network communication process. In this case, the video content may be encoded in, for example, Base64 format.

As shown in FIGS. 1 and 6, the receiver 124 of the web 12 receives the video content, which is encoded after the second-half task at the webserver 13, from the webserver 13 and then decodes the video content (S7 and S8).

Subsequently, the sample video content of which decoding has been completed is transmitted to the preview part 125 and provided to the user S8. In other words, before outputting a holographic stereogram photo, the user may view the produced sample video content through the user terminal 11 and make a selection. In this case, an example of the sample video content provided through the preview part 125 is shown in FIG. 11.

The user may select sample video content that he or she likes out of the sample video content provided through the preview part 125 (S9). The selected sample video content is output.

The sample video content selected by the user out of the sample video content may be output using a holographic stereogram printer that outputs a multi-viewpoint video giving binocular effects. The holographic stereogram printer includes a laser, a spatial optical modulator, a polarizing beam splitter, etc. After a multi-viewpoint image is acquired from a 3D object, the holographic stereogram printer records an interference pattern between object light and reference light on a hologram recording medium. The sample video content, a digital hologram, printed by the holographic stereogram printer may give binocular effects as a 3D image due to a stereoscopic effect based on binocular parallax.

As described above, the present embodiment provides an optimal holographic stereogram photo printing technology for a webserver-based environment to proliferate digital hologram content which is attracting attention as future technology with the high distribution rate of personal mobile phones, tablet PCs, etc.

According to the present invention, image data captured through video capturing in a web environment is subjected to an encoding process to prevent data loss in a network communication process and then transmitted to a webserver, and a webserver decodes the image data and performs a second-half task (postprocessing) on the decoded image data using deep learning such that a high-quality hologram photo can be printed within a relatively short time without any unnecessary process.

According to the present invention, before a holographic stereogram photo is output, optimal data is ensured by performing face recognition, deleting frames with closed eyes (eyeblinks and the like), stabilizing images, equalizing frames (shaking correction and the like), and separating a foreground and a background in a second-half task of a webserver.

Although exemplary embodiments of the present invention have been described and illustrated above using specific terms, the terms are only intended to clearly describe the present invention. It is self-evident that various modifications and alterations can be made from the embodiments of the present invention and the terms without departing from the technical spirit and scope of the following claims. The modified embodiments should not be understood separately from the spirit and scope of the present invention and should be considered as falling within the scope of the claims of the present invention.

What is claimed is:

1. A webserver-based video content production method for printing a holographic stereogram photo, the webserver-based video content production method comprising:
    providing image data acquired by imaging a subject through a user terminal to a web;
    providing the received image data to a webserver;
    performing a second-half task on the received image data using deep learning to produce video content; and
    providing the produced video content to the user terminal through the web; and
    wherein the production of the video content comprises:
    recognizing a face in all frames of the image data received from the web;
    deleting one or more frames with closed eyes among frames of the image data in which the face is recognized;
    only extracting frames having a certain variation less than a threshold from the frames of the image data, in which the one or more frames with closed eyes has been deleted, to stabilize images and equalize the frames of the image data;
    separating the subject and a background in the extracted frames having the certain variation less than the threshold; and
    performing postprocessing on the images in which the subject and the background have been separated to produce video content; and
    wherein the deleting of the one or more frames with closed eyes comprises:
    connecting landmarks of a region, which corresponds to an eye among facial landmarks representing major features of the face, with lines and then generating the region corresponding to the eye;
    calculating an area of the generated region corresponding to the eye; and
    when the calculated area is a set threshold or less, recognizing one or more corresponding frames as frames with closed eyes and deleting the one or more corresponding frames.

2. The webserver-based video content production method of claim 1, wherein the image data is any one of image or video data which is acquired by the user terminal imaging the subject through a camera or webcam provided in the user terminal after accessing the web and image or video data which is captured in advance through the camera or webcam provided in the user terminal and stored in a memory.

3. The webserver-based video content production method of claim 1, wherein, when the user terminal accesses a webpage, the web provides description for hologram photography to the user terminal and supports an imaging assistance tool.

4. The webserver-based video content production method of claim 1, wherein the image data is encoded in Base64 format and then transmitted to the webserver.

5. The webserver-based video content production method of claim 1, wherein the recognizing of the face comprises recognizing the face in the frames of the image data using a Haar cascade classifier to select frames with a front of the face.

6. The webserver-based video content production method of claim 1, wherein the stabilization of the images and the equalization of the frames comprise:
   calculating a variation between previous and subsequent frames of an $n^{th}$ frame among the frames of the image data;
   when the calculated frame variation is the set threshold or more, removing a corresponding frame; and
   only extracting frames having the certain variation less than the threshold.

7. The webserver-based video content production method of claim 1, wherein the separating of the subject and the background comprises separating a foreground and the background using saliency detection based on deep learning which is a protruding object detection technique for separating an object that is most salient when an image is viewed from a background.

8. The webserver-based video content production method of claim 1, wherein the production of the video content further comprises:
   decoding the encoded image data received from the web; and
   encoding the produced video content.

9. The webserver-based video content production method of claim 1, wherein the providing of the produced video content to the user terminal further comprises providing, by the web, the video content received from the webserver to a user through the user terminal such that the user views the video content and makes a selection.

10. The webserver-based video content production method of claim 9, wherein the providing of the produced video content to the user terminal further comprises, when any one piece of the video content is selected by the user, printing, by the web, the selected piece of video content through a holographic stereogram printer.

11. A webserver-based video content production system for printing a holographic stereogram photo, the webserver-based video content production system comprising:
   a user terminal configured to image a subject and acquire image data;
   a web configured to receive the image data from the user terminal; and
   a webserver configured to perform a second-half task on the image data received from the web using deep learning in response to a request from the web to produce video content and then provide the video content to the web; and
   wherein the webserver produces the video content through a process comprising:
   recognizing a face in all frames of the image data received from the web;
   deleting one or more frames with closed eyes among frames of the image data in which the face is recognized;
   only extracting frames having a certain variation less than a threshold from the frames of the image data, in which the one or more frames with closed eyes has been deleted, to stabilize images and equalize the frames of the image data;
   separating the subject and a background in the extracted frames having the certain variation less than the threshold; and
   performing postprocessing on the images in which the subject and the background have been separated; and
   wherein the deleting of the one or more frames with closed eyes comprises:
   connecting landmarks of a region, which corresponds to an eye among facial landmarks representing major features of the face, with lines and then generating the region corresponding to the eye;
   calculating an area of the generated region corresponding to the eye; and
   when the calculated area is a set threshold or less, recognizing one or more corresponding frames as frames with closed eyes and deleting the one or more corresponding frames.

12. The webserver-based video content production system of claim 11, wherein the image data is any one of image or video data which is acquired by the user terminal imaging the subject through a camera or webcam provided in the user terminal after accessing the web and image or video data which is captured in advance through the camera or webcam provided in the user terminal and stored in a memory.

13. The webserver-based video content production system of claim 11, wherein, when the user terminal accesses a webpage, the web provides description for hologram photography to the user terminal and supports an imaging assistance tool.

14. The webserver-based video content production system of claim 11, wherein the web encodes the image data in Base64 format and then transmits the encoded image data to the webserver.

15. The webserver-based video content production system of claim 11, wherein the recognizing of the face comprises recognizing the face in the frames of the image data using a Haar cascade classifier to select frames with a front of the face.

16. The webserver-based video content production system of claim 11, wherein the stabilization of the images and the equalization of the frames comprise:
   calculating a variation between previous and subsequent frames of an $n^{th}$ frame among the frames of the image data;
   when the calculated frame variation is the set threshold or more, removing a corresponding frame; and
   only extracting frames having the certain variation less than the threshold.

17. The webserver-based video content production system of claim 11, wherein the separating of the subject and the background comprises separating a foreground and the background using saliency detection based on deep learning which is a protruding object detection technique for separating an object that is most salient when an image is viewed from a background.

18. The webserver-based video content production system of claim 11, wherein the webserver decodes the encoded image data received from the web, encodes the produced video content, and provides the encoded video content to the web.

19. The webserver-based video content production system of claim 11, wherein the web provides the video content received from the webserver to a user through the user terminal such that the user views the video content and makes a selection.

20. The webserver-based video content production system of claim 19, wherein, when any one piece of the video content is selected by the user, the web prints the selected piece of video content through a holographic stereogram printer.

* * * * *